(12) United States Patent
Lucas et al.

(10) Patent No.: US 10,696,776 B2
(45) Date of Patent: Jun. 30, 2020

(54) WATER-EMULSIFIABLE ISOCYANATES WITH IMPROVED PROPERTIES

(71) Applicant: BASF SE, Ludwigshafen am Rhein (DE)

(72) Inventors: Frederic Lucas, Ludwigshafen am Rhein (DE); Karl Haeberle, Speyer (DE); Sebastian Roller, Mannheim (DE); Rabie Al-Hellani, Ludwigshafen (DE); Ulrich Tromsdorf, Heidelberg (DE)

(73) Assignee: BASF SE, Ludwigshafen am Rhein (DE)

( * ) Notice: Subject to any disclaimer, the term of this patent is extended or adjusted under 35 U.S.C. 154(b) by 13 days.

(21) Appl. No.: 15/754,096

(22) PCT Filed: Sep. 5, 2016

(86) PCT No.: PCT/EP2016/070792
§ 371 (c)(1),
(2) Date: Feb. 21, 2018

(87) PCT Pub. No.: WO2017/042111
PCT Pub. Date: Mar. 16, 2017

(65) Prior Publication Data
US 2018/0244827 A1  Aug. 30, 2018

(30) Foreign Application Priority Data

Sep. 7, 2015 (EP) .................................. 15184131

(51) Int. Cl.
| C08G 18/08 | (2006.01) |
| C08G 18/28 | (2006.01) |
| C08G 18/79 | (2006.01) |
| C08G 18/80 | (2006.01) |
| C09D 175/04 | (2006.01) |

(52) U.S. Cl.
CPC ..... *C08G 18/0871* (2013.01); *C08G 18/0828* (2013.01); *C08G 18/0852* (2013.01); *C08G 18/0866* (2013.01); *C08G 18/283* (2013.01); *C08G 18/288* (2013.01); *C08G 18/792* (2013.01); *C08G 18/8064* (2013.01); *C08G 18/8083* (2013.01); *C09D 175/04* (2013.01)

(58) Field of Classification Search
CPC .............. C08G 18/0871; C08G 18/792; C08G 18/8064; C08G 18/8083; C08G 18/0828; C08G 18/0852; C08G 18/0866; C08G 18/283; C08G 18/288; C09D 175/04
See application file for complete search history.

(56) References Cited

U.S. PATENT DOCUMENTS

| 3,479,310 A | 11/1969 | Dieterich et al. |
| 4,596,678 A | 6/1986 | Merger et al. |
| 4,596,679 A | 6/1986 | Hellbach et al. |
| 5,087,739 A | 2/1992 | Bohmholdt et al. |
| 8,470,444 B2 * | 6/2013 | Costa .................. C08G 18/288 252/182.14 |
| 2004/0034162 A1 | 2/2004 | Laas et al. |
| 2010/0105833 A1 * | 4/2010 | Keller .................. C08G 18/092 524/839 |
| 2015/0225605 A1 | 8/2015 | Steinbrecher et al. |
| 2015/0232609 A1 | 8/2015 | Spyrou et al. |

FOREIGN PATENT DOCUMENTS

| DE | 35 21 618 A1 | 12/1986 |
| DE | 40 01 783 A1 | 7/1991 |
| DE | 42 03 510 A1 | 8/1993 |
| DE | 100 13 186 A1 | 9/2001 |
| DE | 100 13 187 A1 | 10/2001 |
| DE | 10 2012 218 081 A1 | 4/2014 |
| EP | 0 126 299 A1 | 11/1984 |
| EP | 0 126 300 A1 | 11/1984 |
| EP | 0 355 443 A2 | 2/1990 |
| EP | 0 403 921 A2 | 12/1990 |
| EP | 0 697 424 A1 | 2/1996 |
| WO | WO 94/03516 A1 | 2/1994 |
| WO | WO 01/81441 A1 | 11/2001 |
| WO | WO 01/88006 A1 | 11/2001 |
| WO | WO 2005/087828 A1 | 9/2005 |
| WO | WO 2007/039133 A1 | 4/2007 |
| WO | WO 2007/110425 A1 | 10/2007 |
| WO | WO 2008/068198 A1 | 6/2008 |
| WO | WO 2014/048776 A2 | 4/2014 |

OTHER PUBLICATIONS

Machine English translation of WO 94/03516, Patzschke et al., Feb. 1994.*
Yoshida et al., "Prediction of Viscosity of Slurry Suspended Fine Particles Using Coupled DEM-DNS Simulation", Chemical Engineering Transactions, vol. 32, 2013, pp. 2089-2094.*
Montes, et al., "Like Dissolves Like: A Classroom Demonstration and a Guided-Inquiry Experiment for Organic Chemistry", J. Chem Ed, vol. 80, No. 4, Apr. 4, 2003, pp. 447-449.*
Machine English translation of WO 2001/088006, Laas et al., Nov. 2001.*
International Search Report dated Nov. 7, 2016 in PCT/EP2016/070792, 3 pages.
Written Opinion dated Nov. 7, 2016 in PCT/EP2016/070792 (submitting English translation only).
U.S. Appl. No. 15/024,153, filed Aug. 18, 2016, US2016/0237310, Lucas.
U.S. Appl. No. 15/520,863, filed Nov. 16, 2017, US2017/0327626, Roller et al.

(Continued)

*Primary Examiner* — Patrick D Niland
(74) *Attorney, Agent, or Firm* — Oblon, McClelland, Maier & Neustadt, L.L.P.

(57) ABSTRACT

Mixture comprising
a) at least one polyisocyanate,
b) at least one reaction product of at least one polyisocyanate b1) with at least one compound b2) having at least one hydrophilic group which is not reactive toward isocyanate (group A) and precisely one group which is reactive toward isocyanate (group B)
and
c) dioxolane.

8 Claims, No Drawings

(56) References Cited

OTHER PUBLICATIONS

U.S. Appl. No. 15/317,614, filed May 4, 2017, US2017/0121537, Mohr et al.
U.S. Appl. No. 15/523,860, filed Nov. 23, 2017, US2017/0335047, Cohen et al.
U.S. Appl. No. 15/537,103, filed Jun. 16, 2017, Berger et al.
U.S. Appl. No. 15/110,246, filed Nov. 10, 2016, US2016/0326389, Romanato et al.
U.S. Appl. No. 15/754,096, filed Feb. 21, 2018, Lucas et al.
U.S. Appl. No. 15/735,803, filed Nov. 12, 2017, Romanato.
U.S. Appl. No. 15/532,673, filed Dec. 14, 2017, US2017/0355872, Tromsdorf et al.
U.S. Appl. No. 15/567,827, filed Mar. 29, 2018, Schaefer et al.

* cited by examiner

WATER-EMULSIFIABLE ISOCYANATES WITH IMPROVED PROPERTIES

The invention is, in particular, in the field of water-emulsifiable polyisocyanates. Water-emulsifiable polyisocyanates are typically added as crosslinkers to aqueous polymer dispersions and are widely described per se in the literature. The water-emulsifiability can be achieved by blending polyisocyanates with reaction products obtained by reaction of polyisocyanates with hydrophilic compounds.

The invention provides mixtures which comprise
a) at least one polyisocyanate,
b) at least one reaction product of at least one polyisocyanate
   b1) with at least one compound b2) having at least one hydrophilic group which is not reactive toward isocyanate (group A) and precisely one group which is reactive toward isocyanate (group B)
   and
c) dioxolane.

The invention further relates to the use of the mixtures as additives for aqueous polymer dispersions and also two-component coating compositions which are obtainable by addition of the mixture to an aqueous polymer dispersion. Furthermore, the invention provides coated substrates which are obtainable using such a two-component coating composition.

Preferred embodiments may be found in the description. Combinations of preferred embodiments are within the scope of the present invention.

Use properties of aqueous polymer dispersions can be improved by addition of polyisocyanates.

DE-A-35 21 618 discloses polyisocyanates which comprise polyether groups and are thus water-emulsifiable. In DE-A-35 21 618, ethyl acetate, acetone and methyl ethyl ketone, for example, are added as organic solvents to polyisocyanates.

In EP 697424, carbonic esters and lactones are added as solvents to polyisocyanates in order to achieve a reduction in the viscosity.

WO 07110425 describes mixtures of water-emulsifiable polyisocyanates and organic solvents of the formula $C(OR_1)_2(XR_3)R_2$.

WO 9403516 describes mixtures of polyols in water or a water/solvent mixture and polyisocyanates. Mention is made of, inter alia, dioxolane as solvent. Hydrophilic modification of the polyisocyanates is, according to WO 9403516, generally not necessary, but is indicated as possible alternative. The compounds used for hydrophilic modification of the polyisocyanates are not described.

WO/2001/081441 describes mixtures of polyester resins and polyisocyanates. Dioxolane is mentioned, inter alia, as solvent. Hydrophilic modification of the polyisocyanates is mentioned, but the compounds used for this purpose are not described.

It was an object of the present invention to provide mixtures which can be dispersed very finely in polymer dispersions so that the two-component coating compositions obtained have a high storage stability. At the same time, a very great reduction in the viscosity of the water-emulsifiable polyisocyanates should be achieved by a very small addition of solvent in order to make the mixtures easier to stir into the polymer dispersions at high polyisocyanate concentration of the mixtures.

We have accordingly found the above-defined mixtures, their use as additives for aqueous polymer dispersions and also the corresponding two-component coating compositions comprising the mixtures.

The mixture comprises at least one polyisocyanate as component a).

At least one polyisocyanate means one polyisocyanate or a mixture of two or more polyisocyanates of differing composition, with preference being given to one polyisocyanate.

It goes without saying that the expression "one polyisocyanate" likewise encompasses a mixture of polyisocyanates which differ only in terms of their chain length and/or in the arrangement of the monomers in the polymer chain.

The at least one polyisocyanate can be prepared by polymerization of monomeric aromatic, aliphatic and/or cycloaliphatic isocyanates, preferably of aliphatic and/or cycloaliphatic (in this text referred to as (cyclo)aliphatic for short) isocyanates and particularly preferably of aliphatic isocyanates.

Aromatic isocyanates are isocyanates which comprise at least one aromatic ring system, i.e. either purely aromatic compounds or araliphatic compounds. The former are isocyanates in which the isocyanate groups are bound directly to aromatic ring systems, while in the case of the latter the isocyanate groups are bound to alkylene groups but the compounds also comprise aromatic ring systems, as is the case, for example, in $\alpha,\alpha,\alpha',\alpha'$-tetramethylxylylene 1,3-diisocyanate (TMXDI).

Cycloaliphatic isocyanates are ones which comprise at least one cycloaliphatic ring system. Aliphatic isocyanates are ones which comprise exclusively linear or branched carbon chains, i.e. acyclic compounds.

The monomeric aromatic, aliphatic and/or cycloaliphatic isocyanates can in each case be identical or different isocyanates.

The monomeric aromatic, aliphatic and/or cycloaliphatic isocyanates are preferably diisocyanates which bear precisely two isocyanate groups. However, they can in principle also be monoisocyanates having one isocyanate group.

Higher isocyanates having an average of more than two isocyanate groups are also possible in principle. Examples of suitable compounds of this type are triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanato(diphenyl ether) or the mixtures of diisocyanates, triisocyanates and higher polyisocyanates.

The monomeric aromatic, aliphatic and/or cycloaliphatic isocyanates have no significant reaction products of the isocyanate groups with themselves.

The monomeric aromatic, aliphatic and/or cycloaliphatic isocyanates are preferably isocyanates having from 4 to 20 carbon atoms. Examples of customary diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane and also 3- (or 4-), 8- (or 9-)bis(isocyanatomethyl)tricyclo[5.2.1.02.6]decane isomer mixtures, and also aromatic diisocyanates such as tolylene 2,4- or 2,6-diisocyanate and isomer mixtures thereof, m- or p-xylylene diisocyanate, 2,4'- or 4,4'-diisocyanatodiphenylmethane and isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)-cyclohexane, isophorone diisocyanate and 4,4'- or 2,4'-di(isocyanatocyclohexyl)methane, with very particular preference being given to isophorone diisocyanate and hexamethylene 1,6-diisocyanate, in particular hexamethylene 1,6-diisocyanate.

Mixtures of the isocyanates mentioned can also be present.

Isophorone diisocyanate is usually present as a mixture, namely of the cis and trans isomers, generally in a ratio of from about 60:40 to 90:10 (w/w), preferably from 70:30 to 90:10.

Dicyclohexylmethane 4,4'-diisocyanate can likewise be present as a mixture of the various cis and trans isomers.

As diisocyanates, it is possible to use both diisocyanates which are obtained by phosgenation of the corresponding amines and also those which are prepared without the use of phosgene, i.e. by phosgene-free processes. For example, according to EP-A-126 299 (U.S. Pat. No. 4,596,678), EP-A-126 300 (U.S. Pat. No. 4,596,679) and EP-A-355 443 (U.S. Pat. No. 5,087,739), (cyclo)aliphatic diisocyanates, e.g. hexamethylene 1,6-diisocyanate (HDI), isomeric aliphatic diisocyanates having 6 carbon atoms in the alkylene radical, 4,4'- or 2,4'-di(isocyanatocyclohexyl)methane and 1-isocyanato-3-isocyanatomethyl-3,5,5-trimethylcyclohexane (isophorone diisocyanate or IPDI) can be prepared by reacting the (cyclo)aliphatic diamines with, for example, urea and alcohols to form (cyclo)aliphatic biscarbamic esters and thermal dissociation of these into the corresponding diisocyanates and alcohols. The synthesis is usually carried out continuously in a circulatory process and optionally in the presence of N-unsubstituted carbamic esters, dialkyl carbonates and other by-products recirculated from the reaction process. Diisocyanates obtained in this way generally have a very small or even unmeasurable proportion of chlorinated reaction products, which is advantageous, for example, in applications in the electronics industry, without being restricted thereto.

It can be advantageous for the isocyanates used to have a total content of hydrolysable chlorine of less than 200 ppm, preferably less than 120 ppm, particularly preferably less than 80 ppm, very particularly preferably less than 50 ppm, in particular less than 15 ppm and especially less than 10 ppm. This can, for example, be measured according to the ASTM method D4663-98. However, it is of course also possible to use monomeric isocyanates having a higher chlorine content, for example up to 500 ppm.

It is of course also possible to use mixtures of monomeric isocyanates which have been obtained by reaction of the (cyclo)aliphatic diamines with, for example, urea and alcohols and dissociation of the resulting (cyclo)aliphatic biscarbamic esters with diisocyanates which have been obtained by phosgenation of the corresponding amines.

The at least one polyisocyanate to which the monomeric isocyanates can be polymerized generally has the following characteristics:

The average NCO functionality of the at least one polyisocyanate is generally at least 1.8 and can be up to 8, for example up to 6, preferably from 2 to 5 and particularly preferably from 2.4 to 4.

The content of isocyanate groups after the polymerization, calculated as NCO=42 g/mol, is, unless indicated otherwise, generally from 5 to 30% by weight.

The at least one polyisocyanate is preferably selected from among the following compounds:

1) one or more polyisocyanates having isocyanurate groups derived from aromatic, aliphatic and/or cycloaliphatic diisocyanates. Particular preference is given here to the corresponding aliphatic and/or cycloaliphatic isocyanatoisocyanurates and in particular those based on hexamethylene diisocyanate and isophorone diisocyanate. The isocyanurates present here are, in particular, trisisocyanatoalkyl or trisisocyanato-cycloalkyl isocyanurates, which represent cyclic trimers of the diisocyanates, or mixtures with their higher homologs having more than one isocyanurate ring. The isocyanatoisocyanurates generally have an NCO content of from 10 to 30% by weight, in particular from 15 to 25% by weight, and an average NCO functionality of from 2.6 to 8. The polyisocyanates having isocyanurate groups can also contain smaller amounts of urethane and/or allophanate groups, preferably with a content of bound alcohol of less than 2% by weight based on the polyisocyanate.

2) one or more polyisocyanates having uretdione groups and aromatically, aliphatically and/or cycloaliphatically bound isocyanate groups, preferably aliphatically and/or cycloaliphatically bound isocyanate groups, and in particular those derived from hexamethylene diisocyanate or isophorone diisocyanate. Uretdione diisocyanates are cyclic dimerization products of diisocyanates.

Polyisocyanates having uretdione groups are frequently obtained in admixture with other polyisocyanates, in particular those mentioned under item 1). Polyisocyanates having uretdione groups usually have NCO functionalities of from 2 to 3.

For this purpose, the diisocyanates can be reacted under reaction conditions under which both uretdione groups and also the other polyisocyanates are formed, or the uretdione groups are formed first and these are subsequently converted into the other polyisocyanates or the diisocyanates are firstly reacted to form the other polyisocyanates and these are subsequently converted into products comprising uretdione groups.

3) one or more polyisocyanates having biuret groups and aromatically, cycloaliphatically or aliphatically bound, preferably cycloaliphatically or aliphatically bound, isocyanate groups, in particular tris(6-isocyanatohexyl)biuret or mixtures thereof with its higher homologs. These polyisocyanates having biuret groups generally have an NCO content of from 18 to 24% by weight and an average NCO functionality of from 2.8 to 6.

4) one or more polyisocyanates having urethane and/or allophanate groups and aromatically, aliphatically or cycloaliphatically bound, preferably aliphatically or cycloaliphatically bound, isocyanate groups, as are obtained, for example, by reaction of excesses of diisocyanate, for example hexamethylene diisocyanate or isophorone diisocyanate, with monohydric or polyhydric alcohols. These polyisocyanates having urethane and/or allophanate groups generally have an NCO content of from 12 to 24% by weight and an average NCO functionality of from 2.0 to 4.5.

Such polyisocyanates having urethane and/or allophanate groups can be prepared in the absence of catalysts or preferably in the presence of catalysts, for example ammonium carboxylates or ammonium hydroxides or allophanatization catalysts, e.g. bismuth compounds, cobalt compounds, cesium compounds, Zn(II) or Zr(IV) compounds, in each case in the presence of monohydric, dihydric or polyhydric, preferably monohydric, alcohols. Polyisocyanates having urethane and/or allophanate groups frequently occur in mixed forms with the polyisocyanates mentioned under item 1).

5) one or more polyisocyanates comprising oxadiazinetrione groups, preferably derived from hexamethylene diisocyanate or isophorone diisocyanate. Such polyisocyanates comprising oxadiazinetrione groups can be obtainable from diisocyanate and carbon dioxide.

6) one or more polyisocyanates comprising iminooxadiazinedione groups, preferably derived from hexamethylene diisocyanate or isophorone diisocyanate. Such polyisocyanates comprising iminooxadiazinedione groups can be prepared, for example, from diisocyanates by means of specific catalysts.

7) one or more uretonimine-modified polyisocyanates.

8) one or more carbodiimide-modified polyisocyanates.

9) one or more hyperbranched polyisocyanates as are known, for example, from DE-A 10013186 or DE-A 10013187.

10) the polyisocyanates 1)-9) described under the above-mentioned items, preferably 1), 2), 3), 4) and 6), can, after they have been prepared, be converted into polyisocyanates having biuret groups or urethane/allophanate groups and aromatically, cycloaliphatically or aliphatically bound, preferably (cyclo)aliphatically bound, isocyanate groups. The formation of biuret groups is effected, for example, by addition of water or reaction with amines. The formation of urethane and/or allophanate groups is effected by reaction with monohydric, dihydric or polyhydric, preferably monohydric, alcohols, optionally in the presence of suitable catalysts. These polyisocyanates having biuret or urethane/allophanate groups generally have an NCO content of from 10 to 25% by weight and an average NCO functionality of from 3 to 8.

11) polyisocyanates which comprise not only the groups described under 1) to 10) but also groups which are formally formed by addition of molecules having NCO-reactive groups and groups which are crosslinkable by means of UV or actinic radiation onto the isocyanate groups of the above molecules. These molecules are, for example, hydroxyalkyl (meth)acrylates and other hydroxyvinyl compounds.

The diisocyanates or polyisocyanates described above can also be present at least partly in blocked form.

Classes of compounds used for blocking are described in D. A. Wicks, Z. W. Wicks, Progress in Organic Coatings, 36, 148-172 (1999), 41, 1-83 (2001) and 43, 131-140 (2001).

Examples of classes of compounds used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

It can be advantageous for the at least one polyisocyanate to be selected from the group consisting of isocyanurates, biurets, urethanes and allophanates, preferably from the group consisting of isocyanurates, urethanes and allophanates, with particular preference being given to a polyisocyanate comprising isocyanurate groups.

The at least one polyisocyanate is particularly preferably a polyisocyanate based on aliphatic diisocyanates, very particularly preferably based on hexamethylene 1,6-diisocyanate.

Further particular preference is given to the at least one polyisocyanate being a mixture of polyisocyanates, very particularly preferably polyisocyanates based on hexamethylene 1,6-diisocyanate and polyisocyanates based on isophorone diisocyanate.

In a particularly preferred embodiment, the at least one polyisocyanate is a mixture comprising low-viscosity polyisocyanates, preferably low-viscosity polyisocyanates comprising isocyanurate groups, having a viscosity of from 600 to 3500 mPa*s, in particular less than 1500 mPa*s, low-viscosity urethanes and/or allophanates having a viscosity of from 200 to 1600 mPa*s, in particular from 500 to 1500 mPa*s, and/or polyisocyanates comprising iminooxadiazinedione groups and having a viscosity of from 400 to 2000 mPa*s, in particular from 500 to 1500 mPa*s.

The viscosity values indicated in this document are determined in accordance with DIN EN ISO 3219/A.3 at 23° C. using a cone-plate system at a shear rate of 1000 s$^{-1}$, unless indicated otherwise.

The at least one polyisocyanate can, for example, be prepared by methods known to those skilled in the art.

The process for preparing the at least one polyisocyanate can be carried out as described in WO 2008/68198, there in particular on page 20, line 21 to page 27, line 15, which is hereby incorporated by reference into the present patent application.

The reaction can, for example, be stopped as described there on page 31, line 19 to page 31, line 31 and the work-up can be carried out as described there on page 31, line 33 to page 32, line 40, which is in each case incorporated by reference into the present patent application.

The reaction can, as an alternative, also be stopped as described in WO 2005/087828 on page 11, line 12 to page 12, line 5, which is hereby incorporated by reference into the present patent application.

In the process for preparing the at least one polyisocyanate, it is possible to use both catalysts which are not thermally labile and catalysts which are thermally labile.

If thermally labile catalysts are used in the process for preparing the at least one polyisocyanate, it is also possible to stop the reaction by heating the reaction mixture to a temperature above at least 80° C., preferably at least 100° C., particularly preferably at least 120° C. The heating of the reaction mixture as is necessary to separate off the unreacted isocyanate by distillation in the work-up is generally sufficient for this purpose.

Both in the case of catalysts which are not thermally labile and in the case of thermally labile catalysts, it is possible to stop the reaction at lower temperatures by addition of deactivators. Suitable deactivators are, for example, hydrogen chloride, phosphoric acid, organic phosphates such as dibutyl phosphate or diethyl hexyl phosphate, carbamates such as hydroxyalkyl carbamate or organic carboxylic acids.

These compounds are added neat or diluted in a suitable concentration required for terminating the reaction.

Diisocyanates, triisocyanates and higher polyisocyanates can, for example, be obtained by phosgenation of corresponding aniline/formaldehyde condensates and can be polyphenyl polyisocyanates having methylene bridges.

The mixture comprises, as component b), at least one reaction product of at least one polyisocyanate b1) with at least one compound b2).

At least one reaction product means one reaction product or a mixture of two or more reaction products which differ in terms of the components b1) and/or b2), with preference being given to one reaction product.

The at least one polyisocyanate b1) can be identical to or different from the at least one polyisocyanate described under a). The at least one polyisocyanate used under b1) is preferably identical to the at least one polyisocyanate under a).

At least one compound b2) means a mixture of two or more different compounds b2), with preference being given to one compound b2).

The at least one compound b2) can be a monomer, oligomer or polymer.

The at least one compound b2) comprises precisely one group which is reactive toward isocyanate (group B).

For the purposes of the present invention, a group which is reactive toward isocyanate (group B) is a group which has hydrogen atoms which are reactive toward NCO groups or which can form an adduct with NCO groups under the normal process conditions in the reaction. These process conditions are known per se to those skilled in the art.

This group B is, for example, a hydroxy, mercapto, primary or secondary amino group (NH group for short), an epoxide, an acid anhydride group, a monophosphoric ether group or a carbodiimide group. Preference is given to a hydroxy, mercapto or primary or secondary amino group (NH group for short). Particular preference is given to a hydroxy group.

The at least one compound b2) comprises at least one hydrophilic group which is not reactive toward isocyanate (group A).

For the purposes of the present invention, a group which is not reactive toward isocyanate (group A) is a group which cannot form an adduct with NCO groups under the normal process conditions in the reaction. These process conditions are known per se to those skilled in the art.

The group A can be, for example, an ionic group or a group which can be converted into an ionic group.

Anionic groups or groups which can be converted into anionic groups are, for example, carboxyl groups or sulfonic acid groups.

Cationic groups or groups which can be converted into cationic groups are, for example, quaternary ammonium groups or tertiary amino groups.

Groups which can be converted into ionic groups are preferably converted into ionic groups before or during dispersion of the mixture according to the invention in water.

The conversion of, for example, carboxyl groups or sulfonic acid groups into anionic groups can be carried out using inorganic and/or organic bases such as sodium hydroxide, potassium hydroxide, potassium carbonate, sodium hydrogencarbonate, ammonia or primary, secondary and in particular tertiary amines, e.g. triethylamine or dimethylaminopropanol.

To convert tertiary amino groups into the corresponding cations, e.g. ammonium groups, suitable neutralizing agents are inorganic or organic acids, e.g. hydrochloric acid, acetic acid, fumaric acid, maleic acid, lactic acid, tartaric acid, oxalic acid or phosphoric acid, and suitable quaternizing agents are, for example, methyl chloride, methyl iodide, dimethyl sulfate, benzyl chloride, ethyl chloroacetate or bromoacetamide. Further suitable neutralizing agents and quaternizing agents are, for example, described in U.S. Pat. No. 3,479,310, column 6.

The content of ionic groups or groups which can be converted into ionic groups is preferably from 0.1 to 3 mol per kg of the sum of the components a) and b).

The group A can, for example, be a nonionic, hydrophilic group.

Nonionic groups are, for example, polyalkylene ether groups, in particular those having from 10 to 80 alkylene oxide units.

Preference is given to polyethylene ether groups or polyalkylene ether groups which comprise at least 10 ethylene oxide units in addition to other alkylene oxide units, e.g. propylene oxide.

The content of the hydrophilic nonionic groups, in particular the polyalkylene ether groups, is preferably from 0.5 to 20% by weight, particularly preferably from 1 to 30% by weight, based on the sum of the components a) and b).

Compounds suitable as at least one compound b2) are, for example, aliphatic, cycloaliphatic, araliphatic or aromatic hydroxysulfonic or aminosulfonic acids.

The at least one compound b2) is preferably hydroxethanesulfonic acid, hydroxypropane-sulfonic acid, mercaptoethanesulfonic acid, mercaptopropanesulfonic acid, aminomethane-sulfonic acid, taurine, aminopropanesulfonic acid, N-cyclohexylaminopropanesulfonic acid, N-cyclohexylaminoethanesulfonic acid and also alkali metal, alkaline earth metal or ammonium salts thereof and particularly preferably the abovementioned monohydroxysulfonic acids and monoaminosulfonic acids.

The at least one compound b2) is likewise preferably polyalkylene ether alcohols, particularly preferably polyethylene ether alcohols.

The polyalkylene ether alcohols and polyethylene ether alcohols preferably have a molecular weight $M_n$ of at least 500 g/mol, particularly preferably at least 1200 g/mol. The molecular weight $M_n$ can in principle have no upper limit, and is preferably up to 50 000 g/mol, particularly preferably up to 20 000 g/mol, very particularly preferably up to 10 000 g/mol and in particular up to 5000 g/mol.

Preferred OH numbers of the polyalkylene ether alcohols and polyethylene ether alcohols, measured in accordance with DIN 53240-2 (potentiometric), are 40-350 mg KOH/g of solid resin, preferably 80-180 mg KOH/g of solid resin.

To prepare component b), the at least one polyisocyanate b1) is reacted with at least one compound b2).

The preparation of the component b) is known, for example, from DE-A-35 21 618, DE-A-40 01 783 and DE-A-42 03 510.

In the preparation, the at least one compound b2) can be reacted with part of the component a) and subsequently mixed with the remainder of the component a).

However, the preparation can also be carried out by the at least one compound b2) being added to the total amount of the component a) and the reaction then being carried out in the same reaction vessel.

Preferred components b) are compounds having hydrophilic, nonionic groups, in particular polyalkylene ether groups. The water-emulsifiability is here preferably achieved solely by means of the hydrophilic nonionic groups.

The mixture comprises dioxolane as component c).

The mixture preferably comprises from 2 to 70% by weight, particularly preferably from 2 to 50% by weight and very particularly preferably from 2 to 40% by weight, of the dioxolane c), based on the sum of the components a) and b) and c).

The mixture preferably consists of only the components a), b) and c). However, the mixture can further comprise at least one additional solvent such as methoxypropyl acetate, dipropylene glycol, dimethyl ether, butyl glycol acetate, propylene carbonate, TME 1,1,2,2-tetramethoxyethane, dioxane, ethyl acetate, butyl acetate, ethylene glycol monoethyl or ethyl ether acetate, 1-methoxypropyl 2-acetate, 2-butanone, 4-methyl-2-pentanone, cyclohexane, toluene, propylene glycol diacetate, diethylene glycol dimethyl ether, diethylene glycol ethyl or butyl ether acetate, N-methylpyrrolidone, N-methylcaprolactam and THF. In general, the ratio of dioxane to the sum of additional solvents is 90:10-10:90, preferably 70:30-30:70.

The mixture is, for example, suitable as additive, in particular crosslinker, for aqueous polymer dispersions.

The reaction of the mixture with an aqueous polymer dispersion can be carried out under a long period of time, which requires corresponding storage of the mixture. Although the mixture is preferably stored at room temperature, storage can also be carried out at higher temperatures. In practice, heating of the mixture to 40° C., 60° C., even up to 80° C., is quite possible.

The polymers dispersed in the polymer dispersion can be, for example, polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft polymers from the abovementioned groups of materials having, for example, different glass transition temperatures, and also mixtures of the polymers mentioned. Preference is given to polyacrylate polyols, polyester polyols and polyurethane polyols.

Preferred OH numbers, measured in accordance with DIN 53240-2 (potentiometric), are 40-350 mg KOH/g of solid resin for polyesters, preferably 80-180 mg KOH/g of solid resin, and 15-250 mg KOH/g of solid resin for polyacrylate alcohols, preferably from 80 to 160 mg KOH/g.

In addition, the polymers dispersed in the polymer dispersion can have an acid number in accordance with DIN EN ISO 3682 (potentiometric) up to 200 mg KOH/g, preferably up to 150 and particularly preferably up to 100 mg KOH/g.

The polymers dispersed in the polymer dispersion are particularly preferably polyacrylate polyols and polyesterols.

Polyacrylate polyols preferably have a molecular weight $M_n$ of at least 500 g/mol, particularly preferably at least 1200 g/mol. The molecular weight $M_n$ can in principle have no upper limit, and is preferably up to 50 000 g/mol, particularly preferably up to 20 000 g/mol, very particularly preferably up to 10 000 g/mol and in particular up to 5000 g/mol.

The polymers dispersed in the polymer dispersion can be prepared by polymerization according to customary methods. The preparation of the polymers dispersed in the polymer dispersion is preferably carried out by means of emulsion polymerization.

Preference is given to copolymerizing hydroxy-functional monomers in admixture with other polymerizable monomers, preferably free-radically polymerizable monomers.

Hydroxy-functional monomers can be concomitantly used in the copolymerization in such amounts that the abovementioned hydroxyl numbers of the copolymers result, generally corresponding to a hydroxy group content of the copolymers of from 0.5 to 8% by weight, preferably from 1 to 5% by weight.

Preference is given to hydroxyl-comprising copolymers of at least one hydroxyl-comprising (meth)acrylate with at least one further polymerizable comonomer selected from the group consisting of alkyl (meth)acrylates, vinylaromatics, α,β-unsaturated carboxylic acids and other monomers.

As alkyl (meth)acrylates, mention may be made of, for example, $C_1$-$C_{20}$-alkyl (meth)acrylates; vinylaromatics; vinylaromatics having up to 20 carbon atoms, α,β-unsaturated carboxylic acids also encompass anhydrides thereof and other monomers are, for example, vinyl esters of carboxylic acids comprising up to 20 carbon atoms, ethylenically unsaturated nitriles, vinyl ethers of alcohols comprising from 1 to 10 carbon atoms and, less preferably, aliphatic hydrocarbons having from 2 to 8 carbon atoms and 1 or 2 double bonds.

As alkyl (meth)acrylates, preference is given to those having a $C_1$-$C_{10}$-alkyl radical, for example methyl methacrylate, methyl acrylate, n-butyl acrylate, ethyl acrylate and 2-ethylhexyl acrylate.

In particular, mixtures of the alkyl (meth)acrylates are also suitable.

Vinyl esters of carboxylic acids having from 1 to 20 carbon atoms are, for example, vinyl laurate, vinyl stearate, vinyl propionate and vinyl acetate.

α,β-Unsaturated carboxylic acids and anhydrides thereof can be, for example, acrylic acid, methacrylic acid, fumaric acid, crotonic acid, itaconic acid, maleic acid or maleic anhydride, preferably acrylic acid.

As hydroxy-functional monomers, mention may be made of monoesters of α,β-unsaturated carboxylic acids, for example acrylic acid, methacrylic acid (in this text referred to as "(meth)acrylic acid" for short), with diols or polyols which preferably have from 2 to 20 carbon atoms and at least two hydroxy groups, e.g. ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, the hydroxypivalic ester of neopentyl glycol, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3- and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomaltol, polyTHF having a molecular weight in the range from 162 to 4500, preferably from 250 to 2000, poly-1,3-propanediol or polypropylene glycol having a molecular weight in the range from 134 to 2000 or polyethylene glycol having a molecular weight in the range from 238 to 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate and particular preference is given to 2-hydroxyethyl acrylate and/or 2-hydroxyethyl methacrylate.

Possible vinylaromatic compounds are, for example, vinyltoluene, α-butylstyrene, α-methyl-styrene, 4-n-butylstyrene, 4-n-decylstyrene and preferably styrene.

Examples of nitriles are acrylonitrile and methacrylonitrile.

Suitable vinyl ethers are, for example, vinyl methyl ether, vinyl isobutyl ether, vinyl hexyl ether and vinyl octyl ether.

As nonaromatic hydrocarbons having from 2 to 8 carbon atoms and one or two olefinic double bonds, mention may be made of butadiene, isoprene and also ethylene, propylene and isobutylene.

It is also possible to use N-vinylformamide, N-vinylpyrrolidone and N-vinylcaprolactam, also ethylenically unsaturated acids, in particular carboxylic acids, acid anhydrides or acid amides, and also vinylimidazole. Comonomers having epoxide groups, e.g. glycidyl acrylate or methacrylate, or monomers such as N-methoxymethylacrylamide or N-methoxymethacrylamide can also be concomitantly used in small amounts.

Preference is given to esters of acrylic acid or of methacrylic acid having from 1 to 18, preferably from 1 to 8, carbon atoms in the alcohol radical, e.g. methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate or any mixtures of such monomers.

Further polymers dispersed in the polymer dispersion are, for example, polyester polyols as are obtainable by condensation of polycarboxylic acids, in particular dicarboxylic acids, with polyols, in particular diols. In order to ensure a functionality of the polyester polyol which is appropriate for the polymerization, triols, tetrols, etc., and also triacids, etc., are partially also used.

Polyester polyols are known from, for example, Ullmanns Enzyklopädie der technischen Chemie, 4$^{th}$ edition, volume 19, pages 62 to 65. Preference is given to using polyester polyols obtained by reaction of dihydric alcohols with dibasic carboxylic acids. Instead of the free polycarboxylic acids, it is also possible to use the corresponding polycarboxylic anhydrides or corresponding polycarboxylic esters of lower alcohols or mixtures thereof for preparing the polyester polyols. The polycarboxylic acids can be aliphatic, cycloaliphatic, aromatic or heterocyclic and optionally be substituted, e.g. by halogen atoms, and/or be unsaturated. Examples of such polycarboxylic acids are:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophtalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, isomers and hydrogenated products thereof and also esterifiable derivatives, e.g. anhydrides or dialkyl esters, for example $C_1$-$C_4$-alkyl esters, preferably methyl, ethyl or n-butyl esters, of the acids mentioned. Preference is given to dicarboxylic acids of the general formula HOOC—$(CH_2)_y$—COOH, where y is from 1 to 20, preferably an even number from 2 to 20, particularly preferably succinic acid, adipic acid, sebacic acid and dodecanedicarboxylic acid.

Possible polyhydric alcohols for preparing the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF having a molar mass in the range from 162 to 4500, preferably from 250 to 2000, poly-1,3-propanediol having a molar mass in the range from 134 to 1178, poly-1,2-propanediol having a molar mass in the range from 134 to 898, polyethylene glycol having a molar mass in the range from 106 to 458, neopentyl glycol, the neopentyl glycol ester of hydroxypivalic acid, 2-ethyl-1,3-propanediol, 2-methyl-1,3-propanediol, 2,2-bis(4-hydroxycyclohexyl) propane, 1,1-, 1,2-, 1,3- and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomaltol, which may optionally be alkoxylated as described above.

Preference is given to alcohols of the general formula HO—$(CH_2)_x$—OH, where x is from 1 to 20, preferably an even number from 2 to 20. Preference is given to ethylene glycol, butane-1,4-diol, hexane-1,6-diol, octane-1,8-diol and dodecane-1,12-diol. Preference is also given to neopentyl glycol.

Further possibilities are polycarbonate diols as can be obtained by, for example, reaction of phosgene with an excess of the low molecular weight alcohols mentioned as formative components for the polyester polyols.

Polyester diols based on lactones, which are homopolymers or copolymers of lactones, preferably addition products which have terminal hydroxy groups and are formed by addition of lactones onto suitable bifunctional starter molecules, are also suitable. As lactones, preference is given to those which are derived from compounds of the general formula HO—$(CH_2)_z$—COOH, where z is from 1 to 20 and an H atom of a methylene unit can also be substituted by a $C_1$-$C_4$-alkyl radical. Examples are ε-caprolactone, β-propiolactone, gamma-butyrolactone and/or methyl-ε-caprolactone, 4-hydroxybenzoic acid, 6-hydroxy-2-naphthalic acid or pivalolactone and also mixtures thereof. Suitable starter components are, for example, the low molecular weight dihydric alcohols mentioned above as formative components for the polyester polyols. The corresponding polymers of ε-caprolactone are particularly preferred. Lower polyester diols or polyether diols can also be used as starters for preparing the lactone polymers. Instead of the polymers of lactones, it is also possible to use the corresponding, chemically equivalent polycondensates of the hydroxycarboxylic acids corresponding to the lactones.

If the aqueous polymer dispersions are used in polyurethane coatings, molar masses $M_n$ of the polyesters of 800-4000 g/mol are usual, with the polyesters used here not being restricted thereto.

Furthermore, polyetherols prepared by addition of ethylene oxide, propylene oxide and/or butylene oxide, preferably ethylene oxide and/or propylene oxide and particularly preferably ethylene oxide, onto H-active components are also suitable as polymers dispersed in the polymer dispersion. Polycondensates of butanediol are likewise suitable. Molar masses of the polyethers of 500-2000 g/mol are usual in polyurethane coatings, with the polyethers used here not being restricted thereto.

The polymers dispersed in the polymer dispersion can be at least partly replaced by reactive diluents. These can be blocked secondary or primary amines (aldimines and ketimines) or compounds having sterically hindered and/or electron-poor secondary amino groups, for example aspartic esters as described in EP 403921 or WO 2007/39133.

For the purposes of the present text, a two-component coating composition is a mixture intended for coating at least one substrate for the purpose of forming a film and, after curing, a tack-free coating.

The two-component coating composition is obtained by addition of a mixture comprising at least one polyisocyanate, at least one reaction product of at least one polyisocyanate b1) with at least one compound b2) having at least one hydrophilic group which is not reactive toward isocyanate (group A) and precisely one group which is reactive toward isocyanate (group B) and dioxolane to an aqueous polymer dispersion.

The mixture and the aqueous polymer dispersion are preferably mixed with one another in a molar ratio of isocyanate groups in the mixture according to the invention to groups which are reactive toward isocyanate in the aqueous polymer dispersion of from 0.1:1 to 10:1, preferably from 0.2:1 to 5:1, particularly preferably from 0.3:1 to 3:1, very particularly preferably from 0.5:1 to 2:1, in particular from 0.8:1 to 1.2:1 and especially from 0.9:1 to 1.1:1.

The two-component coating composition obtained is suitable for coating substrates such as wood, wood veneer, paper, paperboard, card, textile, film, leather, nonwoven, polymer surfaces, glass, ceramic, mineral building materials such as molded cement bricks and fiber cement plates or metals, which can in each case optionally be precoated or pretreated.

Such coating compositions are suitable as or in interior or exterior coatings, i.e. applications which are exposed to daylight, preferably parts of buildings, coatings on (large) vehicles and aircraft and industrial applications, commercial vehicles in the agricultural and building sector, decorative surface coatings, bridges, buildings, electric pylons, tanks, containers, pipelines, power stations, chemical plants, ships, cranes, posts, sheet pile walls, valves, pipes, fittings, flanges, couplings, halls, roofs and structural steel, furniture, windows, doors, parquetry floors, can coating and coil coating, for floor coverings as in the case of parking decks or in hospitals, in automobile surface coatings as OEM and refinishing.

In particular, the coating compositions according to the invention are used as clear coating(s), base coating(s) and topcoat(s), primers and fillers.

Such coating compositions are preferably used at temperatures in the range from ambient temperature to 80° C., preferably up to 60° C., particularly preferably up to 40° C. Preference is given to articles which can be cured at temperatures which are not too high, for example large machines, aircraft, large-capacity vehicles and refinishing applications.

Coating of the substrates is carried out by conventional methods known to those skilled in the art, with at least one coating composition being applied in the desired thickness to the substrate to be coated and the volatile constituents optionally comprised in the coating composition are removed, optionally by heating. This procedure can, if desired, be repeated one or more times. Application to the substrate can be carried out in a known manner, e.g. by spraying, troweling, doctor blade coating, brushing, application by roller, rolling, casting, laminating, backspraying or coextrusion.

The thickness of such a layer to be cured can be from 0.1 µm to a number of mm, preferably from 1 to 2000 µm, particularly preferably from 5 to 200 µm, very particularly preferably from 5 to 60 µm (based on the surface coating composition in the state in which the solvent has been removed from the surface coating composition).

The mixtures can be dispersed in very finely divided form in aqueous dispersions. The dispersions obtained are very storage-stable. In addition, a very high reduction in the viscosity of the water-emulsifiable polyisocyanates is achieved by a very small addition of solvent.

An advantage of the mixtures is that they give high gloss and good film formation in surface coatings. In addition, the mixtures according to the invention usually have a high resistance to chemicals.

EXAMPLES

Water-Dispersible Polyisocyanate 1:

100 g of HDI isocyanurate having an NCO content of 22.2% and a viscosity of 2800 mPa*s at 23° C. (commercially available as Basonat® HI 100 from BASF SE, Ludwigshafen) were mixed with 15 g of a methanol-initiated monofunctional polyethylene oxide which had been prepared using potassium hydroxide catalysis and had an OH number of 112 (in accordance with DIN 53240) and a molecular weight of 500 g/mol, heated and reacted with one another. After 3 hours at 90° C., the reaction was stopped on reaching the indicated NCO content, which corresponds to complete formation of the urethane. The corresponding product had a viscosity at 23° C. of 2600 mPa*s and an NCO content of 17.9%.

Water-Dispersible Polyisocyanate 2:

As described in the document WO 200188006, 237.5 g of HDI isocyanurate having an NCO content of 22.2% and a viscosity of 2800 mPa*s at 23° C. (commercially available as Basonat® HI 100 from BASF SE, Ludwigshafen), 5.8 g of dimethylcyclohexylamines (BASF SE) and 10 g of 3-(cyclohexylamino)-1-propanesulfonic acid were mixed. After 3 hours at 80° C., the reaction was stopped on reaching the indicated NCO content, which corresponds to complete formation of the urea. The corresponding product had a viscosity at 23° C. of 13 300 mPa*s and an NCO content of 19.3%.

Use Examples

The water-dispersible polyisocyanates 1 and 2 were diluted further in various solvents (90%, 80% and 70%) and the viscosity of the corresponding solutions was measured.

0.1 g of solution was in each case shaken with 10 g of water until everything was emulsified. After 24 hours, the average particle size was measured.

The viscosity was measured at 23° C. in accordance with DIN EN ISO 3219/A.3 in a cone-plate system at a shear rate of 1000 s$^{-1}$.

The weight average particle diameters were measured by light scattering measurements using an Autosizer 2c from Malvern.

Comparative Example 1 a) 90 g of the water-emulsifiable polyisocyanate 1 was mixed with 10 g of dipropylene glycol dimethyl ether
b) 80 g of the water-emulsifiable polyisocyanate 1 was mixed with 20 g of dipropylene glycol dimethyl ether
c) 70 g of the water-emulsifiable polyisocyanate 1 was mixed with 30 g of dipropylene glycol dimethyl ether Comparative Example 2 a) 90 g of the water-emulsifiable polyisocyanate 1 was mixed with 10 g of methoxypropyl acetate
b) 80 g of the water-emulsifiable polyisocyanate 1 was mixed with 20 g of methoxypropyl acetate
c) 70 g of the water-emulsifiable polyisocyanate 1 was mixed with 30 g of methoxypropyl acetate Comparative Example 3 a) 90 g of the water-emulsifiable polyisocyanate 1 was mixed with 10 g of butyl glycol acetate
b) 80 g of the water-emulsifiable polyisocyanate 1 was mixed with 20 g of butyl glycol acetate c) 70 g of the water-emulsifiable polyisocyanate 1 was mixed with 30 g of butyl glycol acetate Comparative Example 4 a) 90 g of the water-emulsifiable polyisocyanate 1 was mixed with 10 g of propylene carbonate
b) 80 g of the water-emulsifiable polyisocyanate 1 was mixed with 20 g of propylene carbonate
c) 70 g of the water-emulsifiable polyisocyanate 1 was mixed with 30 g of propylene carbonate Comparative Example 5 a) 90 g of the water-emulsifiable polyisocyanate 1 was mixed with 10 g of TME 1,1,2,2-tetramethoxyethane
b) 80 g of the water-emulsifiable polyisocyanate 1 was mixed with 20 g of TME 1,1,2,2-tetramethoxyethane
c) 70 g of the water-emulsifiable polyisocyanate 1 was mixed with 30 g of TME 1,1,2,2-tetramethoxyethane Comparative Example 6 a) 90 g of the water-emulsifiable polyisocyanate 1 was mixed with 10 g of dioxane
b) 80 g of the water-emulsifiable polyisocyanate 1 was mixed with 20 g of dioxane
c) 70 g of the water-emulsifiable polyisocyanate 1 was mixed with 30 g of dioxane Example 1 a) 90 g of the water-emulsifiable polyisocyanate 1 was mixed with 10 g of dioxolane
b) 80 g of the water-emulsifiable polyisocyanate 1 was mixed with 20 g of dioxolane
c) 70 g of the water-emulsifiable polyisocyanate 1 was mixed with 30 g of dioxolane Water-Dispersible Polyisocyanate 1:

The water-dispersible polyisocyanate 1 has a viscosity at 23° C. of 2600 mPa*s.

| | Solvent | Dilution | Viscosity @ 23° C. (mPa * s) | Average particle size (nm) |
|---|---|---|---|---|
| Comparative example | | | | |
| 1a) | Dipropylene glycol dimethyl ether | 90% | 600 | 140 |
| 1b) | | 80% | 210 | 194 |
| 1c) | | 70% | 80 | 282 |
| 2a) | Methoxypropyl acetate | 90% | 650 | 130 |
| 2b) | | 80% | 200 | 175 |
| 2c) | | 70% | 60 | 241 |
| 3a) | Butyl glycol acetate | 90% | 2740 | 179 |
| 3b) | | 80% | 550 | 205 |
| 3c) | | 70% | 180 | 306 |
| 4a) | Propylene carbonate | 90% | 900 | 92 |
| 4b) | | 80% | 420 | 94 |
| 4c) | | 70% | 200 | 168 |
| 5a) | TME 1,1,2,2-tetramethoxyethane | 90% | 950 | 107 |
| 5b) | | 80% | 310 | 146 |
| 5c) | | 70% | 170 | 353 |
| 6a) | Dioxane | 90% | 700 | 115 |
| 6b) | | 80% | 250 | 142 |
| 6c) | | 70% | 100 | 204 |
| Example | | | | |
| 1a) | Dioxolane | 90% | 450 | 112 |
| 1b) | | 80% | 160 | 143 |
| 1c) | | 70% | 50 | 203 |

Comparative Example 7 a) 90 g of the water-emulsifiable polyisocyanate 2 was mixed with 10 g of dipropylene glycol dimethyl ether
b) 80 g of the water-emulsifiable polyisocyanate 2 was mixed with 20 g of dipropylene glycol dimethyl ether
c) 70 g of the water-emulsifiable polyisocyanate 2 was mixed with 30 g of dipropylene glycol dimethyl ether Comparative Example 8 a) 90 g of the water-emulsifiable polyisocyanate 2 was mixed with 10 g of methoxypropyl acetate
b) 80 g of the water-emulsifiable polyisocyanate 2 was mixed with 20 g of methoxypropyl acetate
c) 70 g of the water-emulsifiable polyisocyanate 2 was mixed with 30 g of methoxypropyl acetate Comparative Example 9 a) 90 g of the water-emulsifiable polyisocyanate 2 was mixed with 10 g of butyl glycol acetate
b) 80 g of the water-emulsifiable polyisocyanate 2 was mixed with 20 g of butyl glycol acetate
c) 70 g of the water-emulsifiable polyisocyanate 2 was mixed with 30 g of butyl glycol acetate Comparative Example 10 a) 90 g of the water-emulsifiable polyisocyanate 2 was mixed with 10 g of propylene carbonate
b) 80 g of the water-emulsifiable polyisocyanate 2 was mixed with 20 g of propylene carbonate
c) 70 g of the water-emulsifiable polyisocyanate 2 was mixed with 30 g of propylene carbonate Comparative Example 11 a) 90 g of the water-emulsifiable polyisocyanate 2 was mixed with 10 g of TME 1,1,2,2-tetramethoxyethane
b) 80 g of the water-emulsifiable polyisocyanate 2 was mixed with 20 g of TME 1,1,2,2-tetramethoxyethane
c) 70 g of the water-emulsifiable polyisocyanate 2 was mixed with 30 g of TME 1,1,2,2-tetramethoxyethane Comparative Example 12 a) 90 g of the water-emulsifiable polyisocyanate 2 was mixed with 10 g of dioxane
b) 80 g of the water-emulsifiable polyisocyanate 2 was mixed with 20 g of dioxane
c) 70 g of the water-emulsifiable polyisocyanate 2 was mixed with 30 g of dioxane Example 2 a) 90 g of the water-emulsifiable polyisocyanate 2 was mixed with 10 g of dioxolane b) 80 g of the water-emulsifiable polyisocyanate 2 was mixed with 20 g of dioxolane
c) 70 g of the water-emulsifiable polyisocyanate 2 was mixed with 30 g of dioxolane Water-Dispersible Polyisocyanate 2:

The water-dispersible polyisocyanate 2 has a viscosity at 23° C. of 3300 mPa*s.

|  | Solvent | Dilution | Viscosity @ 23° C. (mPa * s) | Average particle size (nm) |
|---|---|---|---|---|
| Comparative example |  |  |  |  |
| 7a) | Dipropylene glycol | 90% | 2500 | 3350 |
| 7b) | dimethyl ether | 80% | 520 | 1550 |
| 7c) |  | 70% | 150 | 195 |
| 8a) | Methoxypropyl acetate | 90% | 2300 | 3657 |
| 8b) |  | 80% | 540 | 1817 |
| 8c) |  | 70% | 170 | 1249 |
| 9a) | Butyl glycol acetate | 90% | 2740 | 3146 |
| 9b) |  | 80% | 550 | 3172 |
| 9c) |  | 70% | 180 | 3793 |
| 10a) | Propylene carbonate | 90% | 900 | 2741 |
| 10b) |  | 80% | 420 | 4122 |
| 10c) |  | 70% | 200 | 1378 |
| 11a) | TME 1,1,2,2- | 90% | 3100 | 2935 |
| 11b) | tetramethoxyethane | 80% | 880 | 2635 |
| 11c) |  | 70% | 360 | 523 |
| 12a) | Dioxane | 90% | 2000 | 2568 |
| 12b) |  | 80% | 620 | 526 |
| 12c) |  | 70% | 40 | 249 |
| Example |  |  |  |  |
| 2a) | Dioxolane | 90% | 1300 | 2385 |
| 2b) |  | 80% | 270 | 493 |
| 2c) |  | 70% | 80 | 138 |

The invention claimed is:

1. A mixture, comprising
   a) at least one polyisocyanate,
   b) at least one reaction product of at least one polyisocyanate b1) with at least one compound b2) having at least one hydrophilic group which is not reactive toward isocyanate (group A) and precisely one group which is reactive toward isocyanat (group B) and
   c) dioxolane,
wherein a content of the group (A) is from 0.1 to 3 mol per kg of the components a) and b),
the group (A) is an ionic group and/or a group which can be converted into an ionic group, and
a content of dioxolane c) is from 2 to 40% by weight based on a sum of the components a) to c).

2. The mixture of claim wherein the at least one polyisocyanate a) is an aliphatic polyisocyanate.

3. The mixture of claim 1, wherein the at least one polyisocyanate a) has a functionality of more than 2.

4. The mixture of claim 1, wherein the group (B) is a hydroxy, mercapto or primary or secondary amino group.

5. An aqueous polymer dispersion, comprising the mixture of claim 1 as an additive.

6. A two-component coating composition, obtained by adding the mixture, of claim 1 to an aqueous polymer dispersion.

7. The two-component coating composition of claim 6, wherein a polymer dispersed in the aqueous polymer dispersion is selected from the group consisting of a polyacrylate polyol, a polyester polyol and a polyurethane polyol.

8. The mixture of claim 1, wherein the content of dioxolane c) is from 10 to 30% by weight based on a sum of the components a) to c).

* * * * *

UNITED STATES PATENT AND TRADEMARK OFFICE
CERTIFICATE OF CORRECTION

PATENT NO. : 10,696,776 B2
APPLICATION NO. : 15/754096
DATED : June 30, 2020
INVENTOR(S) : Lucas et al.

Page 1 of 1

It is certified that error appears in the above-identified patent and that said Letters Patent is hereby corrected as shown below:

On the Title Page

Column 2, Item (56), under "OTHER PUBLICATIONS", Lines 7-8, "J. Chem Ed," should read
-- J. Chem. Ed., --.

In the Claims

In Column 18, Claim 1, Line 8, "isocyanat" should read -- isocyanate --.

In Column 18, Claim 2, Line 16, "claim" should read -- claim 1, --.

In Column 18, Claim 6, Line 25, "mixture," should read -- mixture --.

Signed and Sealed this
First Day of June, 2021

Drew Hirshfeld
*Performing the Functions and Duties of the
Under Secretary of Commerce for Intellectual Property and
Director of the United States Patent and Trademark Office*